United States Patent

[11] 3,624,701

| [72] | Inventor | William L. Kingsley |
| | | El Cerrito, Calif. |
| [21] | Appl. No. | 16,723 |
| [22] | Filed | Mar. 5, 1970 |
| [45] | Patented | Nov. 30, 1971 |
| [73] | Assignees | Warren J. Curry; |
| | | Norman G. Daniels |
| | | San Lorenzo, Calif., part interest to each |

[54] OIL RECLAIM CURTAIN
7 Claims, 10 Drawing Figs.

[52] U.S. Cl. .................................................. 61/1 A,
210/242
[51] Int. Cl. .................................................. E02b 15/04
[50] Field of Search .......................................... 61/1 F, 5;
210/40, 242, DIG. 21

[56] References Cited
UNITED STATES PATENTS

| 3,184,923 | 5/1965 | Galvaing | 210/DIG. 21 |
| 3,389,559 | 6/1968 | Logan | 210/DIG. 21 |
| 3,499,291 | 3/1970 | Mikkelsen | 210/DIG. 21 |
| 3,537,587 | 11/1970 | Kain | 61/1 F |
| 3,369,664 | 2/1968 | Dahan | 210/DIG. 21 |

Primary Examiner—Samih N. Zaharna
Attorney—Boyken, Mohler, Foster & Schwab

ABSTRACT: A collapsible, continuous, generally annular, curtain floatably supported at the surface of a large body of water, and projecting above and below said surface to retain within the area surrounded by said curtain, oil surfacing from a leak or blowout occurring in a subsea oil well during or after drilling. Guy lines connected with and extending radially outwardly from said curtain have anchoring means at their outer ends for quick anchoring of the curtain around the oil-surfacing area, said lines including yieldable means connected with the portion of the curtain projecting above the surface of the water to enable any section of the curtain to yield radially inwardly under outside wave force thereagainst to permit water to spill into the area enclosed by the curtain but to resist outward movement of such section.

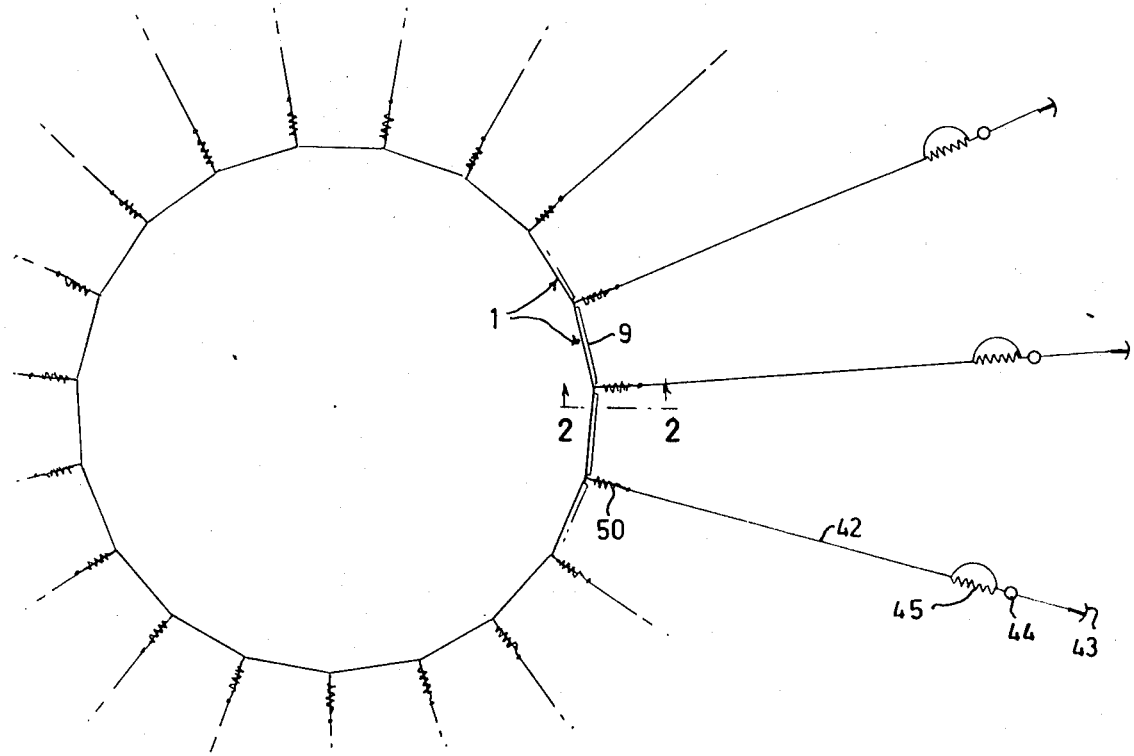
FIG.1
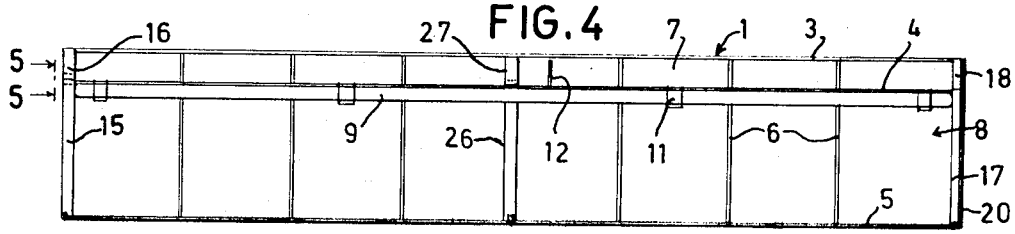
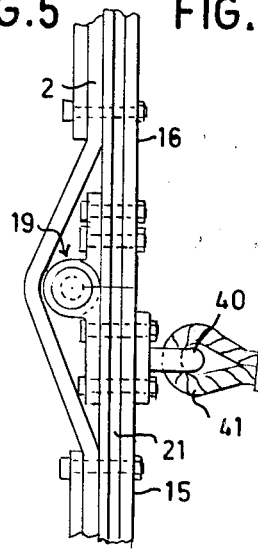
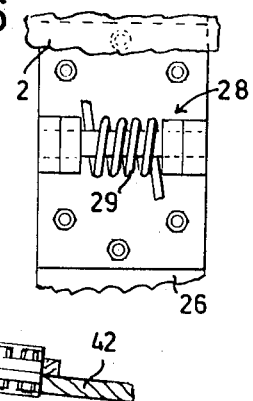
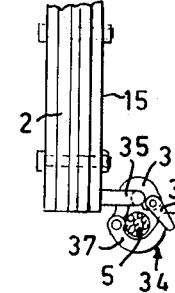
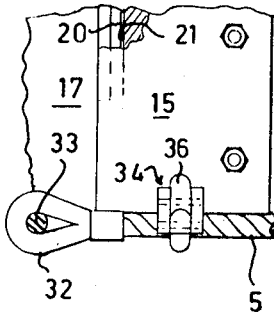
INVENTOR.
WILLIAM L. KINGSLEY
BY
ATTORNEYS

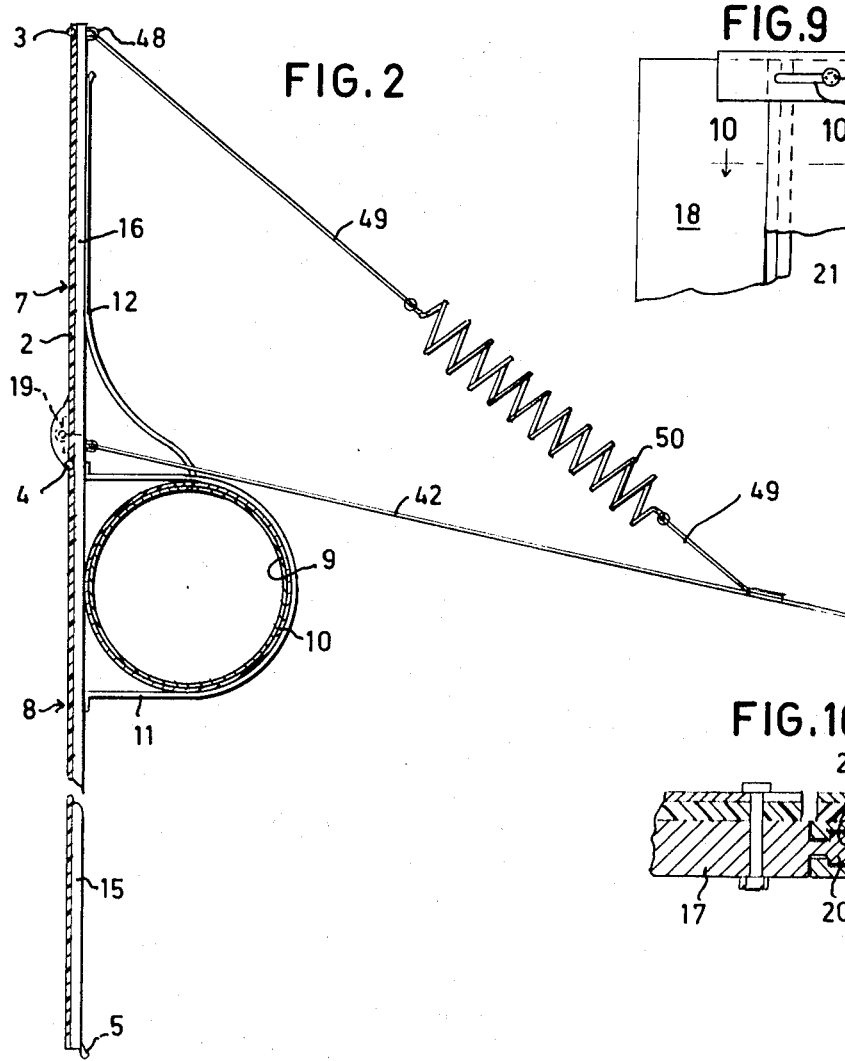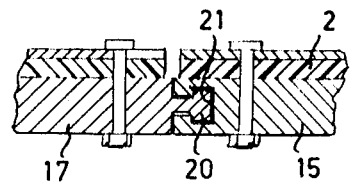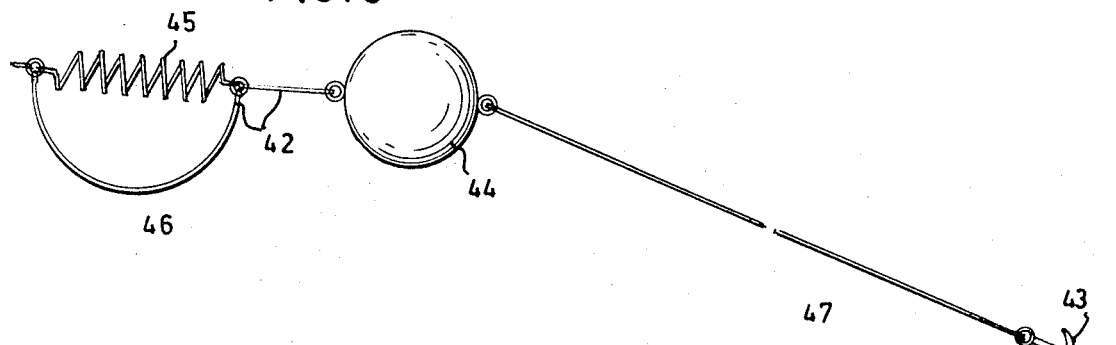

OIL RECLAIM CURTAIN

SUMMARY OF INVENTION

Heretofore, where oil has escaped into a body of water within which drilling for oil has occurred, particularly in offshore drilling, not only has the escaped oil been lost and the water polluted, but irreparable damage to wildlife has occurred, and many years of costly work is required in the attempt to erase the shore and shoreline damage.

One of the objects of the present invention is the provision of a curtain that may be rolled up or stored in sections, and readily transported to the site or area to be enclosed, and quickly installed around said area. When so installed, the surfacing oil resulting from the leak or blowout will be retained within the enclosed area for pumping therefrom and for reclaiming the escaped oil, and most of the damage will be eliminated.

Other objects and advantages will appear in the description and drawings.

DESCRIPTION OF DRAWINGS

FIG. 1 is a semischematic top plan view of a curtain in position, in which one pair of the guy lines at opposite ends of an adjacent pair of sections of the curtain indicate structural features that are common to the other sections.

FIG. 2 is an enlarged, vertical, cross-sectional view at line 2—2 of FIG. 1, broken in height.

FIG. 3 is an enlarged elevational view of a portion of a continuation of the anchor line shown in FIG. 2 but broken in length to accommodate it to the sheet.

FIG. 4 is an enlarged simplified elevational view of one of the sections of the curtain shown in FIG. 1, minus the guy lines and showing the positions of reinforcing cables in full line.

FIG. 5 is an enlarged, fragmentary elevational view of the hinged portion of the curtain shown in FIG. 2 as seen from line 5—5 of FIG. 4.

FIG. 6 is an enlarged fragmentary elevational view of the hinge at the central portion of the curtain shown in FIG. 4.

FIG. 7 is an enlarged, fragmentary, elevational view of a cable end for connecting the ends of adjoining lower cables of adjoining sections, the bolt for connecting the ends and a portion of one of the panels being in cross section.

FIG. 8 is a cross-sectional view along line 8—8 of FIG. 7.

FIG. 9 is a fragmentary elevational view of the connection between adjoining upper ends of a pair of curtains, the curtains being omitted.

FIG. 10 is an enlarged horizontal cross-sectional view of the connection between adjacent ends of a pair of adjoining curtains along line 10—10 of FIG. 9.

DETAILED DESCRIPTION

Referring to FIG. 1, the curtain is preferably made up of a plurality of horizontally elongated panels, each generally designated 1, which panels are vertically positioned in the water, when in use, and are separably connected at their ends. When the panels are in end-to-end relation and are connected at their ends, they form a continuous curtain, which may be annular, although the flexibility permitted between the adjacent pairs of points at their junctures enables variations due to water currents, anchorage, and other conditions. The number of sections used will depend upon the size of the area to be enclosed which, in turn, may depend upon the degree and character of the spread of the oil that surfaces.

Each section 1 comprises an imperforate sheet of tough plastic material that is preferably sufficiently flexible to form into a roll for storage and transportation. Also, each sheet is provided with horizontal, vertically spaced reinforcing cables 3, 4 (FIG. 1) respectively secured to each sheet along its supper edge and a predetermined distance spaced below and parallel with said upper edge, but adjacent thereto, as will later be explained. Vertical, horizontally spaced cables 6 (FIG. 1) at spaced points along the length of each section provide vertical reinforcing. Said cables 3, 4, 6 may be secured to said plastic material by being enclosed within or bonded to the plastic material, or in any other suitable manner. Said vertical cables preferably extend the vertical width of the curtain and the horizontal cables extend from end-to-end of the curtain.

The cable 4 may be designated the "intermediate" cable, and is much closer to the upper cable 3 than it is to the lower edge of the curtain. The width of the curtain between the cable 4 and its upper edge approximately defines the upper marginal portion 7 of the curtain (FIGS. 2, 4), which portion normally projects above the upper level of the body of water in which the curtain is positioned when the curtain is in use. Most of the remainder or lower portion 8 of the curtain extends downwardly into the water.

A horizontally elongated air inflatable float 9 of flexible plastic material, or plastic impregnated or coated fabric is secured against one side of each panel 1 adjacent to, but below the upper marginal portion. This float may be enclosed within a fabric cover 10, (FIG. 2), and flexible straps 11, the latter being secured to the panel by any suitable means such as by rivets, stitching, bonding, etc., and a flexible inflating tube 12 having a valve therein extends upwardly across and is secured to said marginal portion 7 adjacent to the upper edge of the latter. Each float extends substantially from end-to-end of panel 1, (FIG. 4).

Secured to one end of the lower main portion 8 of each panel 1 is a rigid, vertical strip or bar 15 (FIG. 4) and an upward extension 16 of said bar in longitudinal alignment therewith, but separate therefrom, is secured to the upper marginal portion 7. A vertically extending rigid strip or bar 17 is secured to the end of the lower portion 8 opposite to bar 15, and an upward extension 18 of bar 17, but separate therefrom, is secured to the end of the upper marginal portion 7 that is opposite to extension 16 of bar 15.

Bar 15 and its upward extension 16 are relatively wide compared to bar 17 and extension 18, and are hingedly connected by a hinge 19 (FIG. 5) for swinging of the extension inwardly only, relative to the area enclosed by a continuous curtain, when a plurality of said sections are connected to form such curtain, said hinges being on the inner sides of the sections relative to said area, and the adjacent ends of each bar 15 and its upward extension 16 are in abutting relation when the upward extension 16 is in vertical alignment with the bar 15. The plastic sheet 2 forming the panel extends across the juncture line between each bar 17 (FIG. 5) and its upward extension and provides a flexible connection between them, the adjacent ends of each such bar and its extension being in abutting relation when they are in vertical alignment, whereby the extension can only swing inwardly.

Bars 15 and their upward extensions 16 are respectively connected with bars 17 and their extensions 18 to form the continuous curtain, each bar 15 and its extension 16 being formed with an enlarged rib 20 (FIG. 10) along and extending longitudinally of the free edge of each bar that defines the end edge of the panel to which the bar and its extension are secured. The free edge of each bar 17 and its extension 18 define the opposite end edge of each panel, and have a recess 21 formed therein and extending longitudinally thereof, which recess is complementary in cross-sectional contour to the cross-sectional contour of the rib 20. Recess 21 and rib 20 (FIG. 10) terminate short of the lower ends of bars 15, 17 (FIG. 7). Thus, upon sliding the rib 20 endwise into recess 21, the lower end of rib 20 will abut the closed lower end of recess 21 when the upper ends of the upward extensions 16, 18 are flush. A locking member in the form of an inverted channel strip 22 (FIG. 9) is slidably secured and supported on the upper end of each extension 18 for sliding across the juncture between extensions 16, 18, with the upper ends of said extensions within the channel of each strip to lock the extensions, and consequently bars 15, 17 together. A bolt 23, secured on the locking strip 22, extends through a horizontal slot 24 formed in the upper end of extension 16, and nut 24 on said bolt may releasably clamp the slide to the extension 16 when the locking strip is in locking position.

Centrally between the vertical end bars 15, 17 is a vertical rigid strip 26 (FIG. 4) having an upward extension 27 secured to marginal portion 7. This strip and its extension may be the same as bar 15 and extension 16 except that it is without a rib. The strip 26 and its extension 27 are secured to the same side of the plastic curtain as bar 15 and extension 17, and in the same manner, however, the extension 27 is secured to strip 26 by a spring-loaded hinge 28 (FIG. 6) for yieldably holding the extension 27 in vertical alignment with the strip 26 that is therebelow, and the adjacent ends of the strip and its extension are in abutting relation when in alignment as in hinge 19. This enables the marginal portion 7 between the ends of the panel to move inwardly under a predetermined force against the outwardly facing side of the panel and against the resistance of spring 29 when a continuous curtain is formed, as will later be explained in detail.

The lower cable 5 on each section 1 has eyes 32 (FIG. 6) at its ends, which eyes are adapted to register with corresponding eyes on the ends of cables on adjoining panels (not shown) when the bars 15, 17 and their extensions 16, 18 are connected. Bolts 33 or any other suitable means may releasably secure each pair of aligned eyes 32 together.

Clips generally designated 34 secured on the lower end of each bar 15, and strip 26 (FIGS. 6, 7) provide for quickly securing each cable 5 to each panel 1, and if desired, an intermediate clip carried on strip 26 may also support the cable on the curtain, as well as additional loops (not shown).

The lower end of each bar 15 and strip 26 include a horizontal U-bend 35 rigid therewith (FIG. 8) for supporting the clip 28, the latter having a supporting saddle 36 extending over the bend 35 and having a closure 37 hingedly connected at one end to one end of the saddle and swingable to cable retaining position in which position a keeper 38, swingable on the other end of the saddle, holds the closure 37 in closed position. This cable may not only function to reinforce the connection between panels along their lower edges, but provides sufficient weight to hold the panels vertical in the water.

Rigid with the upper end of each bar 15, adjacent to but below the upward extension 16, is a laterally projecting U-bolt or bend 40 (FIG. 5) to which is secured the eye 41 formed in one end of the stay line or cable 42 (FIG. 2). The opposite end of the cable is secured to an anchor 43 (FIG. 1) for anchoring said opposite end to the floor or bed of the body of water in which the curtain is positioned.

A buoy 44 (FIGS. 1, 3) is interposed in the line 42 for supporting the cable portion of the cable between the anchor and curtain at generally the surface of the water in a position extending approximately radially outwardly of the curtain, and for marking the approximate position of the anchor, and for further absorbing stress on the line upon surges against the curtain.

A coil spring 45 is secured at its ends to each cable 42 at a location between the buoy and the curtain to leave a slack snubber-link 46 (FIG. 3) in the cable, to also provide for progressively relieving strains placed on the cables due to wave action or any surges created in the body of water that would otherwise tend to loosen the anchor or place sudden undesirable strain on the cable and curtain.

A U-bolt 48 (FIG. 2) similar to bolt 40 is secured to the upper end of each extension 16, and one end of a line 49 is connected to said bolt in the same manner as the connection between cable 42 and bolt 40, while the opposite end of said line is connected with the cable 42 at a point spaced outwardly of the curtain. Line 49 includes as a section thereof a coil spring 50. This spring is normally under tension holding the adjoining pairs of extensions 16, 18 upright, however, in offshore drilling and wherever waves at one side of the continuous curtain drive against the upwardly projecting marginal portion 7 with a force beyond a predetermined safe amount, the marginal portion will yield to swing downwardly against the resistance of springs 29, 50 to permit the water to spill over the curtain into the area enclosed thereby, but as the marginal portion 7 cannot swing outwardly, the oil in the area enclosed by the curtain cannot escape.

In offshore drilling, the wave movement is shoreward, hence the seaward side of the curtain will normally be depressed for spilling water into the area enclosed by the curtain, but irrespective of the direction of application of the force and the reason therefor, the marginal portion 7 will only yield to admit water thereover, and not to permit the escape of oil within the area enclosed by the curtain. There is sufficient flexibility in the connections between sections to permit the described flexing of the upper marginal portion.

It is not intended that the present invention is to be limited as to dimensions, but where each section is approximately 100 feet in length and approximately 18 feet in vertical width, of which the upper marginal portion projects approximately 4 feet above the surface of the water, the sections may be rolled on spools or stored flat and, as already pointed out, the circumferential length of the curtain may vary according to circumstances.

I claim:

1. An oil reclaim curtain for restricting the spread and movement of oil surfacing in a predetermined area on a body of water from offshore, subsurface operations, comprising:
   a. a continuous, vertically disposed curtain having a main lower portion and a marginal upper portion,
   b. supporting means connected with said curtain for floatingly supporting it in said body of water at the upper surface thereof in a position with said marginal portion projecting a substantial distance above said upper surface and with said main portion extending a substantial distance into said body of water,
   c. anchoring means connected with said curtain for anchoring said curtain in said position,
   d. said curtain being flexible and extending generally annularly when in said position, for extending around the oil surfacing in said area.
   e. vertically extending circumferentially spaced rigid strips secured to said curtain for reinforcing said curtain at spaced points therearound.
   f. said vertically extending strips each comprising an upper length thereof extending the vertical width of said marginal portion and a lower length thereof separate from said upper length extending the vertical width of said main lower portion, said lower lengths being hingedly connected with the upper lengths thereabove for swinging said upper lengths including said marginal portion inwardly relative to the area enclosed by said curtain, under the influence of wave force thereagainst,
   g. means for holding said upper lengths and said marginal portion against swinging thereof outwardly relative to said area, and
   h. means connected with said upper lengths for yieldably resisting swinging of said marginal portion and said upper lengths inwardly and for yieldably returning said upper lengths and said marginal portion to vertically extending position after swinging thereof inwardly.

2. In a curtain as defined in claim 1;
   i. said anchoring means including cables each having an inner end connected with the upper end of the lower length of one of said strips, and an outer end, and an anchor on said outer end for securing said cables in positions extending radially outwardly of said curtain,
   j. yieldable means interposed in said cable for yieldably holding a portion of said cable slack to dampen tension applied to said curtain through surge forces in the body of water in which said curtain is to be supported.

3. In a curtain as defined in claim 2;
   k. a buoy connected with each of said cables at a point between said yieldable means interposed in said cable and said anchor for holding the portions of said cables between said curtain and said buoy extending generally horizontally with the portions extending between said buoys and said anchors extending slantingly downwardly relative to horizontal.

4. An oil reclaim curtain for restricting the spread and movement of oil surfacing in a predetermined area on a body of water from offshore, subsurface, drilling operations, comprising:
  a. a continuous, vertically disposed curtain having a main lower portion and a marginal upper portion,
  b. supporting means connected with said curtain for floatingly supporting it in said body of water at the upper surface thereof in a position with said marginal portion projecting a substantial distance above said upper surface and with said main portion extending a substantial distance into said body of water,
  c. anchoring means connected with said curtain for anchoring said curtain in said position.
  d. said curtain being flexible and extending generally annularly when in said position, for extending around the oil surfacing in said area.
  e. vertically extending, circumferentially spaced rigid strips secured to said curtain for reinforcing said curtain at spaced points therearound.
  f. said vertically extending strips each comprising an upper length thereof extending the vertical width of said marginal portion and a lower length thereof separate from said upper length extending the vertical width of said main lower portion, said lower lengths being hingedly connected with the upper lengths including said marginal portion inwardly relative to the area enclosed by said curtain, under the influence of wave force thereagainst,
  g. means for holding said upper lengths and said marginal portion against swinging thereof outwardly relative to said area, and
  h. means connected with said upper lengths for yieldably resisting swinging of said marginal portion and said upper lengths inwardly and for yieldably returning said upper lengths and said marginal portion to vertically extending position thereof inwardly.
  i. said anchoring means including cables each having an inner end connected with the upper end of the lower length of one of said strips, and an outer end, and an anchor on said outer end for securing said cables in positions extending radially outwardly of said curtain,
  j. secondary yieldable means interposed in said cable for yieldably holding a portion of said cable slack to dampen tension applied to said curtain through surge forces in the body of water in which said curtain is to be supported,
  k. primary yieldable tension means connected with the upper ends of the upper lengths of said strips and with said cables at points spaced outwardly of said curtain and said secondary yieldable means being interposed in said cables outwardly of said last mentioned portion relative to said curtain.

5. An oil reclaim curtain for restricting the spread and movement of oil surfacing in a predetermined area on a body of water from offshore, subsurface drilling operations, comprising:
  a. a continuous, vertically disposed curtain having a main lower portion and a marginal upper portion,
  b. supporting means connected with said curtain for floatingly supporting it in said body of water at the upper surface thereof in a position with said marginal portion projecting a substantial distance above said upper surface and with said main portion extending a substantial distance into said body of water,
  c. anchoring means connected with said curtain for anchoring said curtain in said position.
  d. said curtain being flexible and extending generally annularly when in said position, for extending around the oil surfacing in said area.
  e. said curtain being in separable sections extending circumferentially of said curtain,
  f. rigid vertical strips secured to opposite ends of each section including means thereon for releasably holding adjacent pairs of said sections together in end-to-end relation;
  g. said strips each comprising a length thereof extending the vertical width of the upper marginal portion of the section to which it is secured, and a lower length thereof hingedly connected with the upper length thereover and extending the vertical width of the lower main portion of the section,
  h. said anchoring means including a cable having an inner end connected with the upper end of the lower length of one of said strips at one end of each section, and having an outer end connected with an anchor for anchoring each cable in a position extending generally radially outwardly of said curtain,
  i. yieldable means respectively connected with the upper end of the upper length of the strip that is connected with said cable for yieldably holding the upper marginal portion of each portion of each section upright, and
  j. means for positively restricting said upper lengths of said strips to swinging inwardly only relative to the area enclosed by said curtain, against the yieldable resistance of said yieldable means.

6. An oil reclaim curtain for restricting the spread and movement of oil surfacing in a predetermined area on a body of water from offshore, subsurface drilling operations, comprising:
  a. a curtain having a main lower portion and a marginal upper portion joined thereto,
  b. supporting means connected with said curtain for floatingly supporting it in said body of water at the upper surface thereof in a position with said marginal portion positioned upright and projecting a substantial distance above said upper surface and with said main portion extending downwardly a substantial distance into said body of water,
  c. anchoring means connected with said curtain for anchoring said curtain in said position,
  d. said curtain extending generally annularly when in said position, for extending around the oil surfacing in said area,
  e. said curtain being in flexibly connected sections extending circumferentially of said curtain,
  f. means supporting said marginal portion on said main portion for inward downward movement of the sections thereof at any point around the curtain from said upright position to a lowered position under a predetermined degree of force of wave movement against the outer side of said marginal portion at such point in a direction toward the area within said curtain and toward the opposite side whereby surface water and oil may enter said area over the marginal portion so lowered,
  g. means for holding said marginal portion against downward outward movement from said upright position to a lowered position under the force of wave movement in any degree against the inner side of said curtain in a direction from within said area outwardly thereof,
  h. means connected with said marginal portion for automatically restoring the lowered sections to upright position upon lessening of the force of said wave movement to below said predetermined degree.

7. In a curtain as defined in claim 6;
  i. said means supporting said marginal portion on said main portion including members hingedly connecting said marginal portion with said main portion for inward swinging said marginal portion relative to said main portion,
  j. said means connected with said marginal portion for automatically restoring it to upright position from said lowered position comprising springs yieldably resistant to inward swinging of said marginal portion relative to said main portion.

* * * * *